United States Patent
Petta et al.

(10) Patent No.: US 8,645,246 B2
(45) Date of Patent: Feb. 4, 2014

(54) PROCESSING HEALTH ASSESSMENT

(75) Inventors: Richard John Petta, Matthews, NC (US); Nicola Deakin Rivera, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 289 days.

(21) Appl. No.: 13/051,042

(22) Filed: Mar. 18, 2011

(65) Prior Publication Data

US 2012/0239411 A1    Sep. 20, 2012

(51) Int. Cl.
*G06Q 40/00* (2012.01)
*G06Q 10/00* (2012.01)

(52) U.S. Cl.
USPC ............................................. 705/35

(58) Field of Classification Search
USPC ........................................ 705/2, 35
See application file for complete search history.

(56) References Cited

U.S. PATENT DOCUMENTS

| | | | |
|---|---|---|---|
| 7,216,088 B1 * | 5/2007 | Chappel et al. | 705/7.17 |
| 7,356,377 B2 | 4/2008 | Schwarm | |
| 8,204,779 B1 * | 6/2012 | Hughes et al. | 705/7.39 |
| 2002/0111826 A1 * | 8/2002 | Potter et al. | 705/2 |

OTHER PUBLICATIONS

Bates, Reducing the Frequency of Errors in Medicine Using Information Technology, 2001, J Am Med Inform Assoc 2001;8:299-308.*

Doyle, Accruals Quality and Internal Control over Financial Reporting, 2007, The Accounting Review, vol. 82, No. 5, pp. 1141-1170.*

* cited by examiner

*Primary Examiner* — Tran Nguyen
(74) *Attorney, Agent, or Firm* — Banner & Witcoff, Ltd.; Michael A. Springs

(57) ABSTRACT

A system and method of evaluating the health of one or more work processes is provided. The system and method may include determining a plurality of categories of criteria and determining a plurality of criteria for evaluation. A score for each determined criteria may be determined for a first process and the scores of each criterion may be combined to determine an overall score for the first process. If additional processes are available for evaluation, a score for each identified criterion will be determined for an additional process or processes. An overall score for the additional process(es) may be determined and compared to the overall score of the first process.

26 Claims, 6 Drawing Sheets

PROCESSING HEALTH ASSESSMENT

BACKGROUND

Companies today are always looking for ways to improve efficiency and ensure that policies, procedures, and the like are being followed in the intended manner. However, there are very few ways to determine whether processes are being followed as intended or are being implemented as intended. Often times, the existing ways to determine how work processes are operating are lengthy, time consuming and inefficient. Further, some existing means of evaluating work processes are subjective and make comparison with processes in other lines of business, work functions, and the like difficult. Accordingly, a quick, easy-to-use, objective framework for evaluating work processes would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of evaluating a health of a work process is provided. In some examples, the system and method may identify a plurality of categories of criteria for a first process. The system and method may include identifying a plurality of process health assessment criteria for the first process. Each criterion may be associated with an identified category. The system and method may further include determining a score for each identified criterion for the first process. The scores of each criterion may be combined to determine an overall score.

In some examples, additional processes may be available for evaluation. In order to ease comparison of the additional processes with the first process, a score may be determined for the same or substantially the same criteria for the additional process(es). An overall score may then be determined for the additional process(es) and the overall scores may be compared to identify processes that would benefit from improvement.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
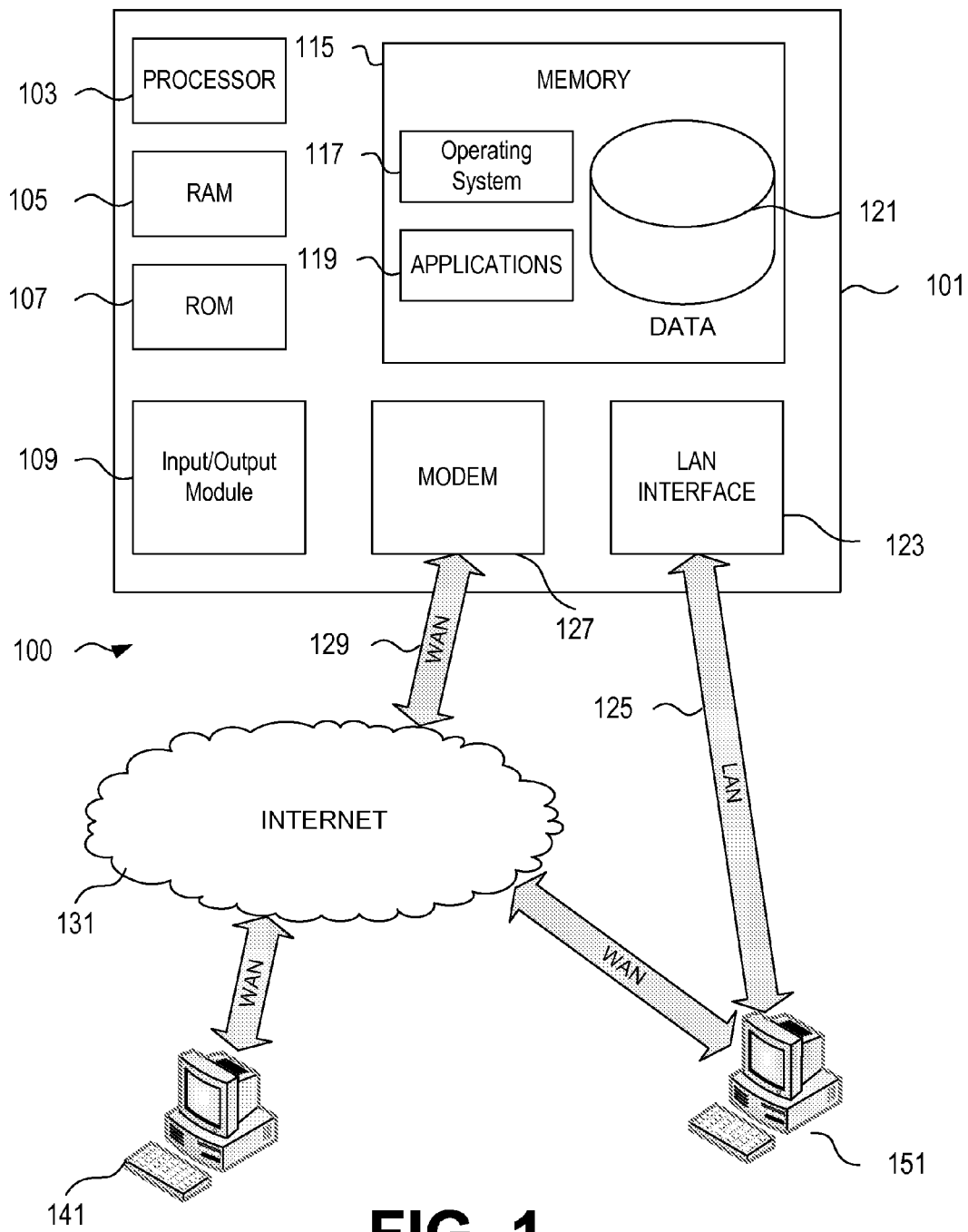
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in various businesses or corporate entities, such as financial institutions, as well as government organizations, universities, and other organizations that evaluate processes. For instance, although evaluation tools may exist to determine the effectiveness of various processes, the framework, system, method, and the like described herein may be used to determine how closely a process conforms to various standards, procedures, policies, and the like that have been put in place for that process.

As discussed herein, processes may include various work processes within one or more groups, departments, business units, and the like within an entity. For example, the framework, system method, and the like described herein may be applied to any type of business process, such as business processes in the financial, accounting, human resources, fulfillment, supply chain, risk, and the like business types. Such processes may include perform general accounting, process accounts payable, generate payments, perform planning and forecasting, maintain fixed assets, process employee expense reimbursements, and the like. Additional business types and/or processes may be used with the systems and methods described herein without departing from the invention.

In some examples, the systems and methods described herein may include a plurality of process health assessment criteria. The criteria may include who owns the process or how many owners the process may have, whether customers of the process have been identified and who those customers might be, the level of backup that may exist for the process (experience and depth), the current state of the process maps, whether operational metrics for the process exist and how often they are reviewed, whether internal or external audits have been conducted on the process, how an owner is alerted to a problem or failure of the process, whether a person or group has been identified as being accountable for the process, quality of the data, data provisioning/data flow, the number of versions of the process, whether the process supports a regulatory requirement, the number of systems used with the process and age of the systems, and/or whether there are any declining or not permitted technologies associated with the process. These criteria are provided as examples of some criteria that may be used with the process health assessment system, method, and the like described herein. However, additional criteria may be used without departing from the invention.

Figure 2:
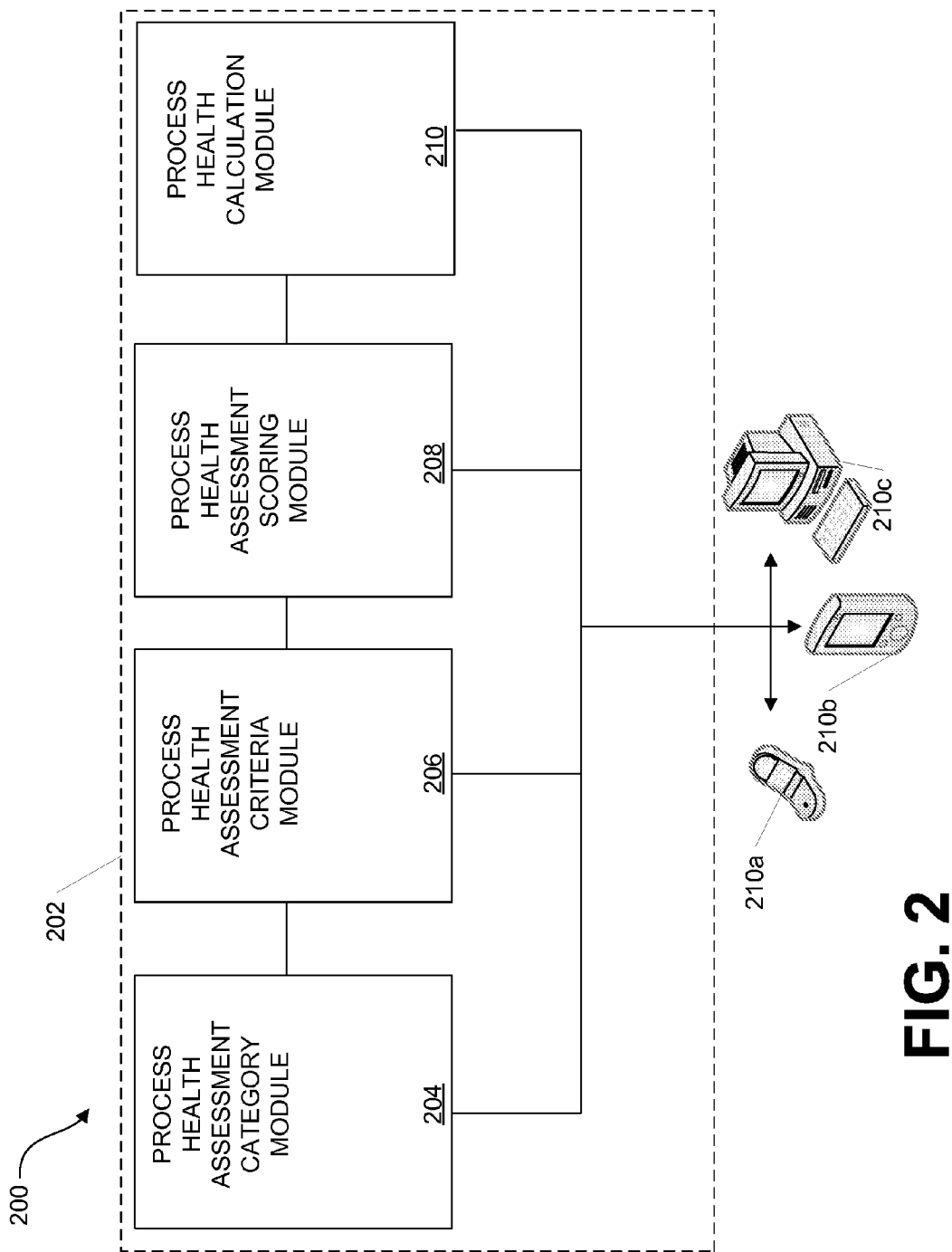
FIG. 2 illustrates an example system for evaluating the health of work processes according to one or more aspects described herein.

FIG. 2 illustrates one example system for evaluating and determining health of one or more processes. The system 200 may be contained within an entity 202 implementing the process health assessment system. For instance, if the system 200 is assessing process health for various processes within a company, such as a financial institution, the system 200 may be contained within the company (e.g., 202). Additionally or alternatively, the system 200 may assess the health of processes internal to the entity 202 and/or external to the entity 202. For instance, the process being evaluated may be implemented by, operated by, owned by, and the like any entity other than the financial institution 202.

The system 200 may include a process health assessment category module 204. The process health assessment category module 204 may identify one or more categories of criteria for evaluation of each process. For instance, the process health assessment category module 204 may identify categories such as, people, process, technology and/or data. Identified criteria for evaluation may fall into one or more of these categories. Although four categories are described, more or fewer categories may be identified without departing from the invention. For instance, additional categories, such as compliance/regulation, business impact, and the like may be identified by the process health assessment category module 204 without departing from the invention.

The system 200 may further include a process health assessment criteria module 206. The process health assessment criteria module 206 may identify one or more criteria for evaluation of a process. Process health assessment criteria, such as those described above, may be identified and associated with one or more of the identified categories. The system 200 may further include a process health assessment scoring module 208. The scoring module 208 may determine a score for each criterion identified by the process health assessment criteria module 206. In some examples, the score may be on a scale such as 1 to 10, 1 to 3, and the like. In some arrangements, a higher score might indicate a better score, while in other examples a lower score might indicate a better score.

Various guidelines for determining the score may be available for each criterion. For instance, if the criterion being considered is who owns the process or how many owners the process may have, a score of 1 may be assigned when it is unclear who the process owner is, 2 may be assigned when multiple process owners are involved or 3 may be assigned when a single process owner has been identified and agreed upon. If the criterion being considered is whether customers of the process have been identified and who those customers might be, a score of 1 may be assigned if the downstream customers are unknown, a score of 2 may be assigned if the customers are known but customer information has not been collected, and a score of 3 may be assigned if customers are known and customer information has been collected. If the criterion being evaluated is the level of backup that may exist for the process (experience and depth), a score of 1 may be assigned if little or no backup exists, vacations/sick outages present a challenge to operations or turnover is high, a score of 2 may be assigned if a coverage model exists or if turnover is low, and a score of 3 may be assigned if succession planning/cross training of jobs/skills exist and there is low turnover.

In another example, if the criterion being scored is the current state of the process maps, a score of 1 may be assigned if some process documentation exists, a 2 if current state process maps exist for all variants of the process, and a 3 if current state process maps exist and are stored in an accessible location. If the criterion being evaluated is whether operational metrics for the process exist and how often they are reviewed, a score of 1 may be assigned if no operational metrics are regularly published for the process, 2 if operational metrics exist and are reviewed less often than monthly, and a 3 if metrics exist and are reviewed at least monthly. If the criterion being evaluated is whether internal or external audits have been conducted on the process, a score of 1 may be assigned if internal or external audit findings exist with no action plan or an action plan that is lacking in any way, a score of 2 may be assigned if internal or external audit findings exist and have an action plan that is in place and is current or on target, a score of 3 may be assigned if no history of internal or external audit exists for the previous six months.

If the criteria being evaluated is how an owner is alerted to a problem or failure of the process, a score of 1 may be assigned if there are no warnings or alerts, a score of 2 may be assigned if the sole warning is at the end of the process, and a score of 3 may be assigned if immediate warnings/multiple controls are built into the process. If the criterion being scored is whether a person or group has been identified as being accountable for the process, a score of 1 may be assigned if executive level accountability is not defined, a score of 2 may be assigned if executive level accountability is defined, and a score of 3 may be assigned if governance and sustainability routines are in place. If the criterion being evaluated is quality of the data, a score of 1 may be assigned if profiling or data quality measures of data elements are not in place or data quality standards are not published, a score of 2 may be assigned if key business elements are identified and measured against data quality standards and data quality reports are published on a schedule, and a score of 3 may be assigned if data quality self monitoring activities are defined and followed and defects are identified in a timely manner.

If the criterion being evaluated is data provisioning/data flow, a score of 1 may be assigned if data is distributed on a reactive basis with little or no controls, a score of 2 may be assigned if all data flows into and out of the system are documented, and a score of 3 may be assigned if data provisioning and consumption occurs according to a domain roadmap. If the criterion being evaluated is the number of versions of the process, a score of 1 may be assigned if there are more than 2 or an unknown number of versions, a score of 2 may be assigned when there are 2 versions, and a score of 3 may be assigned when there is 1 version. If the criterion being scored is whether the process supports a regulatory requirement, a yes or no may be entered and no score may be associated with the yes or no. If the criterion being evaluated is the number of systems used with the process and age of the systems, information may be inserted providing the desired information. If the criterion being evaluated is whether there are any declining or not permitted technologies associated with the process, a yes or no may be provided and a score may or may not be associated with the yes or no. These criteria and guidelines for scoring are provided as examples of some criteria and guidelines that may be used with the process health assessment system, method, and the like described herein. More, fewer or other criteria, guidelines for scoring, and the like may be used without departing from the invention.

The system 200 may further include a process health assessment calculation module 210. The process health assessment calculation module 210 may receive the scores identified in the scoring module 208 and may process them to determine an overall health score for the process. In some examples, the process health assessment calculation module 210 may take an average of the determined scores for each of the criteria. In some additional examples, the process health assessment calculation module 210 may determine an overall score for each category of criteria. For instance, the calculation module may determine an average score for all criteria in one or more categories such that the process health for that particular category may be determined.

The system 200 may evaluate the process health of a variety of processes across all types of lines of business, types of business, functions, and the like. For instance, the process health assessment system, method, and the like may be used to evaluate processes in technology groups such as Information Technology, business groups such as accounting, finance, and the like, operations groups, and the like. It provides for evaluation of each process on the same or substantially the same criteria in order to accurately compare the health of the various processes. Further, the process health assessment system, method, and the like may be used to evaluate a large number of processes because it is relatively simple, short, efficient, and the like.

The process health assessment category module 204, process health assessment criteria module 206, process health assessment scoring module 208 and process health assessment calculation module 210 may receive input from one or more users. For instance, users may access the one or more modules 204-210 through a network, such as the Internet, an intranet, and the like, using one or more user devices, such as user devices 212a-212c. For instance, a user may interact with one or more modules 204-210 using a cell phone or smart phone 210a, personal digital assistant 210b or computer 210c.

Figure 3:
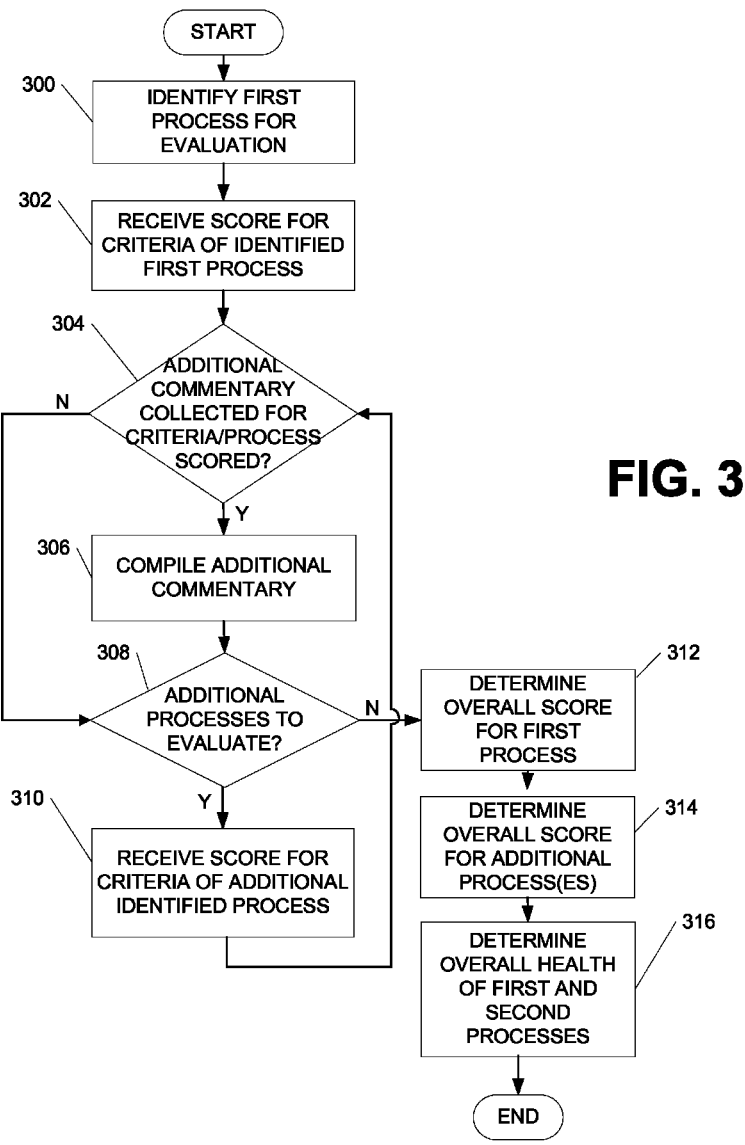
FIG. 3 illustrates one example method of evaluating the health of work processes according to one or more aspects described herein.

FIG. 3 illustrates one example method of evaluating and determining the process health of one or more processes using, for example, the above described system. In step 300, a first process for evaluation is identified. As discussed above, the process may be in a variety of business units, types of business, and the like. In step 302, a score for criteria of the first identified process is received. For instance, a variety of example criteria have been described above. A score for one or more of these criteria may be received in order to determine the overall process health of the identified process. In step 304, a determination is made as to whether additional commentary has been collected for the criteria and/or the process scored. Additional criteria may include comments, suggestions, and the like identified through the scoring process. If additional commentary is available, the commentary may be compiled in step 306.

If, in step 304, no additional commentary has been collected, or if in step 306 the additional commentary has been compiled, a determination is made in step 308 as to whether additional processes are available for evaluation. For instance, a first process may be scored and then a second, third, and the like process may be evaluated using the same or substantially the same criteria as the criteria on which the first process was evaluated. If additional processes are available for evaluation, a score for the criteria of the additional identified process may be received in step 310. For instance, because the criteria (number, type, and the like) have been determined and scored for the first process, the criteria being scored for the second process will be the same or substantially the same. This aids in ensuring that all processes are evaluated based on the same criteria and provides an objective score for comparison between processes.

Once the score for the additional identified process is received, the method returns to step 304 to determine whether additional commentary has been collected and further determination of whether there are additional processes to evaluate in step 308. If additional processes are available, the scores will be received for those processes, as in step 310. If no additional processes are available, the overall score for the first process will be determined in step 312. The overall score for any additional processes may be determined in step 314. In step 316 the overall health of each process evaluated may be determined based on the overall scores and, in some examples, a comparison of the overall scores of all processes evaluated. The overall health determined may aid in identifying processes needing improvement (e.g., risk mitigation, controls, governance, performance, and the like) and/or which processes should receive resources available (e.g., funding, new technology, manpower to improve standards, metrics, and the like).

Figure 4:
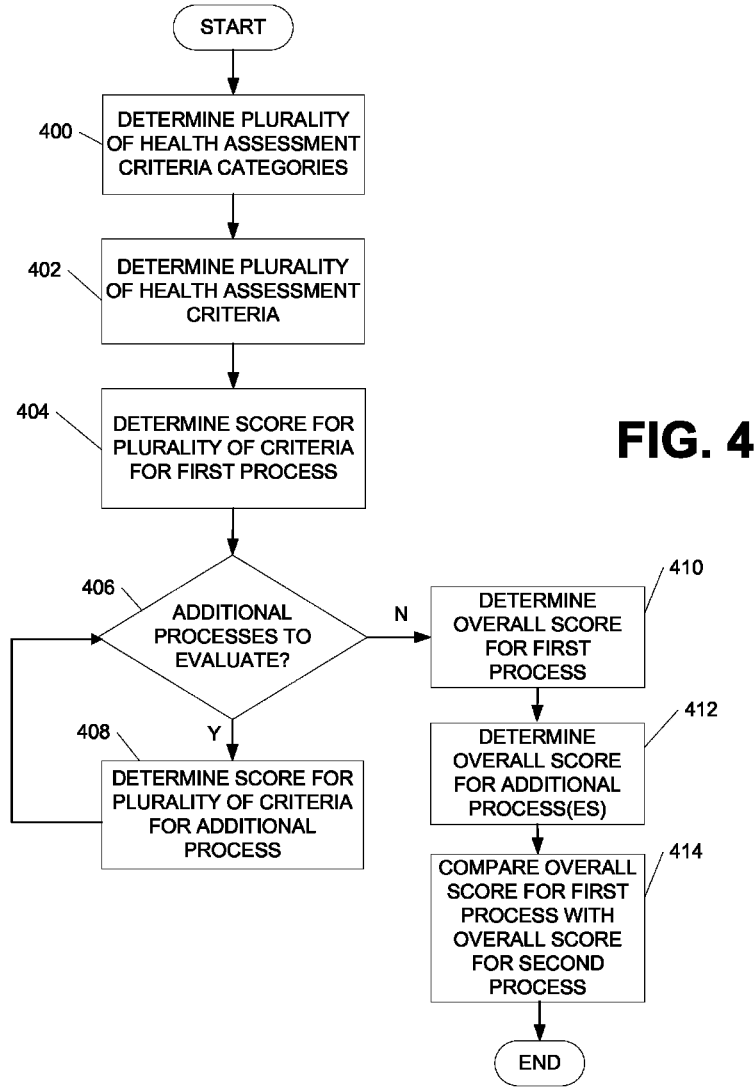
FIG. 4 illustrates another example method for evaluating the health of work processes according to one or more aspects described herein.

FIG. 4 is another example method of evaluating the process health of one or more processes according to aspects described herein. In step 400, a plurality of health assessment criteria categories are determined. For instance, as discussed above, the process may have criteria in one or more categories, such as people, process, technology, data, and the like. In step 402, a plurality of criteria associated with the categories may be determined. In step 404, a score for each criterion within the plurality of identified criteria may be determined. In step 406, a determination is made as to whether there are additional processes available for evaluation. If so, the score for each of the identified criteria will be determined for the additional process(es) in step 408. If no additional processes are available for evaluation, the overall process health score for the first process may be determined in step 410. Determining the overall process health score may include combining the scores determined for each criterion within the plurality of criteria. In some examples, an average of the score for each criterion may be the overall score for the process.

If additional processes were evaluated, an overall score for the additional process(es) may be determined in step 412. In step 414, the overall scores determined for each process evaluated may be compared to identify one or more processes needing improvement in the implementation of the process. For instance, the determined overall process health score may indicate how well the process is being implemented. For example, the overall health process score may be an indicator of how metrics are being used/monitored for the process, whether contingency plans are in place should the process fail, whether process procedures are being followed, and the like. A low score (or high score depending on the scale being used) may indicate a need for resources to improve one or more aspects of the process.

Figure 5A:
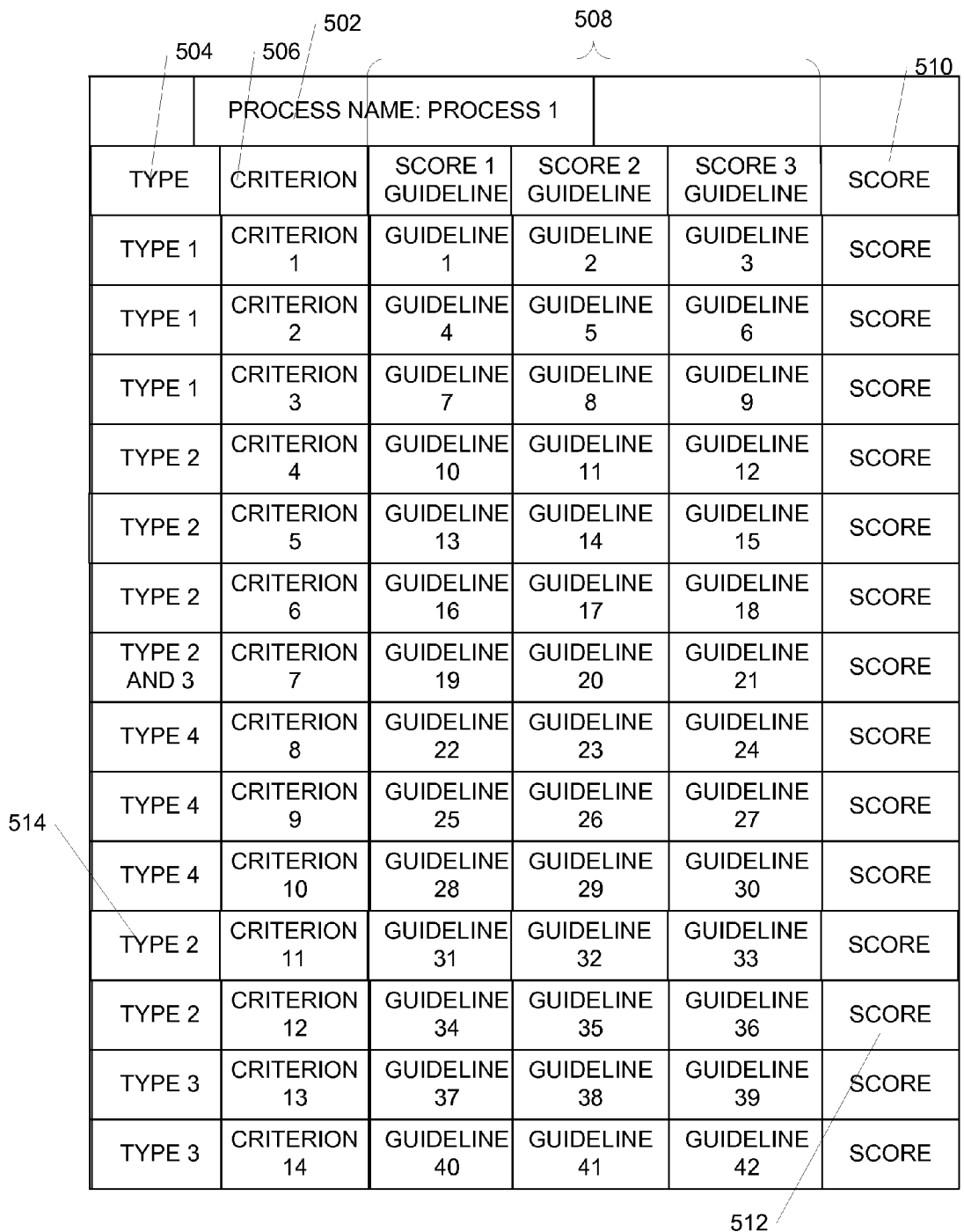
FIG. 5A illustrates one example interface illustrating criteria for evaluating the health of work processes and an example scoring system data according to one or more aspects described herein.

FIG. 5A illustrates one example process health assessment framework. The processes, scores, responses, and the like shown in FIG. 5A are merely examples. Additional criteria, processes, scores, scales, responses, and the like may be used without departing from the invention. Field 502 indicates a name of the process being evaluated. In column 504, a category associated with the criteria being evaluated is identified. Column 506 includes the criteria being scored/evaluated for the process. Fields 508 include the scores available for assignment to each criteria, as well as an explanation of circumstances in which each score should be applied. In field 510 a score is provided for each criterion.

In some examples, one or more criteria may have a score that is not readily combinable with the other scores. For instance, field 512 in FIG. 5A may include a yes or no response. In arrangements having criteria of this type, the yes or no may receive a score (e.g., 1 for yes, 2 for no, and the like) that may convert the answer to a score that may be used. Additionally or alternatively, the criteria may not be included in the overall score and may simply be represented with the results. Further, some scores may be determined based on additional factors. For instance, the number of versions of a process (e.g., field 514) may be scored, in some examples, on a scale of 1 to 3. The criteria may get a score of 3 if only one version of the process exists (e.g., one version may be easiest to control, monitor, and the like, and thus would get the highest score), a score of 2 if 2 versions exists, or a score of 1 if more than 2 versions exist or are in use. Similar scoring arrangements may be used with 3 being the lowest score and 1 being the highest, or on different scales (e.g., 1-10, 1-100, and the like) without departing from the invention.

Figures 5B, 5C:
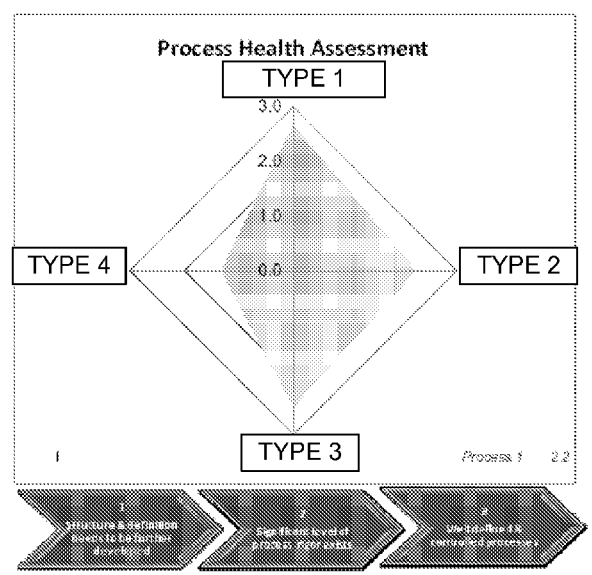
FIG. 5B illustrates one example table summarizing the scores for each criterion in FIG. 5A and providing an overall score according to one or more aspects described herein.
FIG. 5C is illustrates one example graphical representation of the determined scores for evaluating the health of a process according to one or more aspects described herein.

FIG. 5B illustrates some example interface providing results of the process health assessment framework described herein. Interface 550 provides a summary of scores for each criterion, as well as an overall score in field 552. As discussed above, the score for the criteria having a yes or no answer is merely displayed as "yes" and is thus represented in the results. Interface 560 provides a summary of the overall score for each identified category of criteria. For instance, all criteria in the people category had an overall score (e.g., average) of 2.7. The scores, values, and the like provided in FIGS. 5A, 5B and 5C are merely examples and should not be viewed as limiting in any way.

FIG. 5C illustrates one example graphical representation of the results of the process health assessment framework. As shown in the interface of FIG. 5C, an overall score near 1 may indicate that the structure and definition of the process may need further development, a score near 2 may indicate that a significant level of process rigor exists and a score of 3 may indicate a well defined and controlled process. These overall score thresholds may aid indicating which process(es) may require improvement, allocation of resources, additional technology enhancements, and the like.

As an additional advantage, the relative brevity and ease of implementing the process health assessment framework allows the framework to be used multiple times to evaluate the same process to track improvement in the process. For instance, a process may be evaluated to obtain a baseline overall process health score. As improvements are made to the process, the process is revised, and the like the process may be evaluated again to identify areas of improvement, areas still needing improvement, and the like. Finally, in some examples, upon completion of work on the process, the process may be evaluated again to identify overall improvement in the process from the baseline.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
   receiving, by a process health assessment system comprising at least one computer processor, process information associated with a first process in a first business unit of a financial institution, the process information associated with the first process including a first score and a second score, the first score being associated with a first process health assessment criterion, the second score being associated with a second process health assessment criterion, the first process health assessment criterion assessing whether an internal or external audit has been conducted, the first score reflecting whether an internal or external audit has been conducted for the first process, the first score having a first value if an internal or external audit has been conducted for the first process, and the first score having a second value if an internal or external audit has not been conducted for the first process, the second value being different from the first value;

receiving, by the process health assessment system, process information associated with a second process in the first business unit of the financial institution, wherein the process information associated with the second process includes a third score and a fourth score, the third score being associated with the first process health assessment criterion and reflecting whether an internal or external audit has been conducted for the second process, the third score having a third value if an internal or external audit has been conducted for the second process, and the third score having a fourth value if an internal or external audit has not been conducted for the second process, the fourth value being different from the third value, and the fourth score being associated with the second process health assessment criterion;

combining, by the at least one computer processor, the first score and the second score to determine an overall score for the first process, wherein the overall score for the first process indicates an effectiveness of how one or more metrics are being used to monitor the first process, an indication of whether or not one or more contingency plans are in place should the first process fail, and an indication of whether or not one or more process procedures associated with the first process are being followed;

combining, by the at least one computer processor, the third score and the fourth score to determine an overall score for the second process, wherein the overall score for the second process indicates an effectiveness of how one or more metrics are being used to monitor the second process, an indication of whether or not one or more contingency plans are in place should the second process fail, and an indication of whether or not one or more process procedures associated with the second process are being followed;

determining, by the at least one computer processor, a health of the first process based on the overall score for the first process; and determining, by the at least one computer processor, a health of the second process based on the overall score for the second process.

2. The method of claim 1, further including:

receiving, by the process health assessment system, a plurality of scores for the first process, each score of the plurality of scores for the first process corresponding to one or more of a plurality of process health assessment criteria;

receiving, by the process health assessment system, a plurality of scores for the second process, each score of the plurality of scores for the second process corresponding to one or more of the plurality of process health assessment criteria;

determining, by the process health assessment system, an average of the plurality of scores for the first process;

determining, by the process health assessment system, an average of the plurality of scores for the second process;

determining, by the process health assessment system and based on the average of the plurality of scores for the first process, an overall health of the first process; and determining, by the process health assessment system and based on the average of the plurality of scores for the second process, an overall health of the second process.

3. The method of claim 2, wherein the plurality of process health assessment criteria includes at least 10 criteria.

4. The method of claim 1, further including:

receiving, by the process health assessment system, process information associated with a third process, the third process being in a second business unit, the second business unit being different from the first business unit, the process information associated with the third process including a fifth score and a sixth score, the fifth score being associated with the first process health assessment criterion, and the sixth score being associated with the second process health assessment criterion;

combining the fifth score and the sixth score to determine an overall score for the third process; and determining a health of the third process based on the overall score for the third process.

5. The method of claim 4, wherein combining the fifth score and the sixth score includes determining an average of the fifth score and the sixth score.

6. The method of claim 1, wherein combining the first score and the second score includes taking an average of the first score and the second score.

7. The method of claim 1, wherein combining the third score and fourth score includes determining an average of the third score and the fourth score.

8. The method of claim 1, wherein determining the health of the first process and the second process includes allocating a resource to one of the first process and the second process based on the overall score for the first process and the overall score for the second process.

9. A method, comprising:

determining, by at least one computer processor of a process health assessment system, a plurality of categories of process health assessment criteria;

determining, by the at least one computer processor of the process health assessment system, a plurality of process health assessment criteria, each criterion of the plurality of process health assessment criteria being associated with one of the plurality of categories of process health assessment criteria, wherein the plurality of process health assessment criteria includes at least one criterion for assessing whether an internal or external audit has been conducted;

determining, by the at least one computer processor of the process health assessment system, a plurality of scores for a first process in a first business unit of a financial institution, each of the plurality of scores for the first process corresponding to at least one of the plurality of process health assessment criteria, wherein determining the plurality of scores for the first process comprises determining a score for the at least one criterion for assessing whether an internal or external audit has been conducted that reflects whether an internal or external audit has been conducted for the first process, wherein determining the score for the at least one criterion for assessing whether an internal or external audit has been conducted for the first process comprises assigning a first value to the score for the at least one criterion for assessing whether an internal or external audit has been conducted for the first process if an internal or external audit has been conducted for the first process and assigning a second value to the score for the at least one criterion for assessing whether an internal or external audit has been conducted for the first process if an internal or external audit has not been conducted for the first process, the second value being different from the first value;

determining, by the at least one computer processor of the process health assessment system, a plurality of scores for a second process in the first business unit of the financial institution, each of the plurality of scores for the second process corresponding to at least one of the plurality of process health assessment criteria, wherein determining the plurality of scores for the second process comprises determining a score for the at least one criterion for assessing whether an internal or external audit has been conducted that reflects whether an internal or external audit has been conducted for the second process, wherein determining the score for the at least one criterion for assessing whether an internal or external audit has been conducted for the second process comprises assigning a third value to the score for the at least one criterion for assessing whether an internal or external audit has been conducted for the second process if an internal or external audit has been conducted for the second process and assigning a fourth value to the score for the at least one criterion for assessing whether an internal or external audit has been conducted for the second process if an internal or external audit has not been conducted for the second process, the fourth value being different from the third value;

combining, by the at least one computer processor of the process health assessment system, the plurality of scores for the first process to determine an overall score for the first process, wherein the overall score for the first process indicates an effectiveness of how one or more metrics are being used to monitor the first process, an indication of whether or not one or more contingency plans are in place should the first process fail, and an indication of whether or not one or more process procedures associated with the first process are being followed;

combining, by the at least one computer processor of the process health assessment system, the plurality of scores for the second process to determine an overall score for the second process, wherein the overall score for the second process indicates an effectiveness of how one or more metrics are being used to monitor the second process, an indication of whether or not one or more contingency plans are in place should the second process fail, and an indication of whether or not one or more process procedures associated with the second process are being followed; and comparing, by the at least one computer processor of the process health assessment system, the overall score for the first process and the overall score for the second process to determine an allocation of resources.

10. The method of claim 9, wherein combining the plurality of scores for the first process to determine an overall score for the first process includes determining an average of the plurality of scores for the first process, and wherein combining the plurality of scores for the second process includes determining an average of the plurality of scores for the second process.

11. The method of claim 9, wherein the first process is in a first business unit and the second process is in a second business unit, the second business unit being different from the first business unit.

12. The method of claim 9, further including:
identifying a portion of the plurality of process health assessment criteria that are associated with a category of the plurality of categories of process health assessment criteria;
identifying a portion of the plurality of scores for the first process that correspond to one or more of the portion of the plurality of process health assessment criteria; and
combining the portion of the plurality of scores for the first process to determine a category score for the first process, the category score for the first process corresponding to the category of the plurality of categories of process health assessment criteria.

13. The method of claim 9, further including:
identifying a portion of the plurality of process health assessment criteria that are associated with a category of the plurality of categories of process health assessment criteria;
identifying a portion of the plurality of scores for the second process that correspond to one or more of the portion of the plurality of process health assessment criteria; and
combining the portion of the plurality of scores for the second process to determine a category score for the second process, the category score for the second process corresponding to the category of the plurality of categories of process health assessment criteria.

14. The method of claim 9, wherein the plurality of process health assessment criteria includes at least 10 criteria.

15. One or more non-transitory computer readable media storing computer readable instructions that, when executed by one or more computers, cause the one or more computers to:
determine a plurality of categories of process health assessment criteria;
determine a plurality of process health assessment criteria, each criterion of the plurality of process health assessment criteria being associated with one of the plurality of categories of process health assessment criteria, wherein the plurality of process health assessment criteria includes at least one criterion for assessing whether an internal or external audit has been conducted;
determine a plurality of scores for a first process in a first business unit of a financial institution, each of the plurality of scores for the first process corresponding to at least one of the plurality of process health assessment criteria, and the plurality of scores for the first process comprising a score for the at least one criterion for assessing whether an internal or external audit has been conducted that reflects whether an internal or external audit has been conducted for the first process, wherein the score for the at least one criterion for assessing whether an internal or external audit has been conducted that reflects whether an internal or external audit has been conducted for the first process is determined by assigning a first value to the score for the at least one criterion for assessing whether an internal or external audit has been conducted that reflects whether an internal or external audit has been conducted for the first process if an internal or external audit has been conducted for the first process and assigning a second value to the score for the at least one criterion for assessing whether an internal or external audit has been conducted that reflects whether an internal or external audit has been conducted for the first process if an internal or external audit has not been conducted for the first process, the second value being different from the first value;

determine a plurality of scores for a second process in the first business unit of the financial institution, each of the plurality of scores for the second process corresponding to at least one of the plurality of process health assessment criteria, and the plurality of scores for the second process comprising a score for the at least one criterion for assessing whether an internal or external audit has been conducted that reflects whether an internal or external audit has been conducted for the second process, wherein the score for the at least one criterion for assessing whether an internal or external audit has been conducted that reflects whether an internal or external audit has been conducted for the second process is determined by assigning a third value to the score for the at least one criterion for assessing whether an internal or external audit has been conducted that reflects whether an internal or external audit has been conducted for the second process if an internal or external audit has been conducted for the second process and assigning a fourth value to the score for the at least one criterion for assessing whether an internal or external audit has been conducted that reflects whether an internal or external audit has been conducted for the second process if an internal or external audit has not been conducted for the second process, the fourth value being different from the third value;

combine the plurality of scores for the first process to determine an overall score for the first process, wherein the overall score for the first process indicates an effectiveness of how one or more metrics are being used to monitor the first process, whether or not one or more contingency plans are in place should the first process fail, and whether or not one or more process procedures associated with the first process are being followed;

combine the plurality of scores for the second process to determine an overall score for the second process, wherein the overall score for the second process indicates an effectiveness of how one or more metrics are being used to monitor the second process, an indication of whether or not one or more contingency plans are in place should the second process fail, and an indication of whether or not one or more process procedures associated with the second process are being followed; and compare the overall score for the first process and the overall score for the second process to determine an allocation of resources.

16. The one or more non-transitory computer readable media of claim 15, wherein the instructions, when executed by the one or more computers, cause the one or more computers to:
determine an average of the plurality of scores for the first process; and
determine an average of the plurality of scores for the second process.

17. The one or more non-transitory computer readable media of claim 15, wherein the first process is in a first business unit and the second process is in a second business unit, the second business unit being different from the first business unit.

18. The one or more non-transitory computer readable media of claim 15, wherein the instructions, when executed by the one or more computers, cause the one or more computers to:
identify a portion of the plurality of process health assessment criteria that are associated with a category of the plurality of categories of process health assessment criteria;
identify a portion of the plurality of scores for the first process that correspond to one or more of the portion of the plurality of process health assessment criteria; and
combine the portion of the plurality of scores for the first process to determine a category score for the first process, the category score for the first process corresponding to the category of the plurality of categories of process health assessment criteria.

19. The one or more non-transitory computer readable media of claim 15, wherein the instructions, when executed by the one or more computers, cause the one or more computers to:
identify a portion of the plurality of process health assessment criteria that are associated with a category of the plurality of categories of process health assessment criteria;
identify a portion of the plurality of scores for the second process that correspond to one or more of the portion of the plurality of process health assessment criteria; and
combine the portion of the plurality of scores for the second process to determine a category score for the second process, the category score for the second process corresponding to the category of the plurality of categories of process health assessment criteria.

20. The one or more non-transitory computer readable media of claim 15, wherein the plurality of process health assessment criteria includes at least 10 criteria.

21. An apparatus, comprising:
at least one processor; and
a memory storing instructions that, when executed by the at least one processor, cause the apparatus to:
determine a plurality of categories of process health assessment criteria;
determine a plurality of process health assessment criteria, each criterion of the plurality of process health assessment criteria being associated with one of the plurality of categories of process health assessment criteria, wherein the plurality of process health assessment criteria includes at least one criterion for assessing whether an internal or external audit has been conducted;
determine a plurality of scores for a first process in a first business unit of a financial institution, each of the plurality of scores for the first process corresponding to at least one of the plurality of process health assessment criteria, and the plurality of scores for the first process comprising a score for the at least one criterion for assessing whether an internal or external audit has been conducted that reflects whether an internal or external audit has been conducted for the first process, wherein the score for the at least one criterion for assessing whether an internal or external audit has been conducted that reflects whether an internal or external audit has been conducted for the first process is determined by assigning a first value to the score for the at least one criterion for assessing whether an internal or external audit has been conducted that reflects whether an internal or external audit has been conducted for the first process if an internal or external audit has been conducted for the first process and assigning a second value to the score for the at least one criterion for assessing whether an internal or external audit has been conducted that reflects whether an internal or external audit has been conducted for the first process if an internal or external audit has not been conducted for the first process, the second value being different from the first value;

determine a plurality of scores for a second process in the first business unit of the financial institution, each of the plurality of scores for the second process corresponding to at least one of the plurality of process health assessment criteria, and the plurality of scores for the second process comprising a score for the at least one criterion for assessing whether an internal or external audit has been conducted that reflects whether an internal or external audit has been conducted for the second process, wherein the score for the at least one criterion for assessing whether an internal or external audit has been conducted that reflects whether an internal or external audit has been conducted for the second process is determined by assigning a third value to the score for the at least one criterion for assessing whether an internal or external audit has been conducted that reflects whether an internal or external audit has been conducted for the second process if an internal or external audit has been conducted for the second process and assigning a fourth value to the score for the at least one criterion for assessing whether an internal or external audit has been conducted that reflects whether an internal or external audit has been conducted for the second process if an internal or external audit has not been conducted for the second process, the fourth value being different from the third value;

combine the plurality of scores for the first process to determine an overall score for the first process, wherein the overall score for the first process indicates an effectiveness of how one or more metrics are being used to monitor the first process, an indication of whether or not one or more contingency plans are in place should the first process fail, and an indication of whether or not one or more process procedures associated with the first process are being followed;

combine the plurality of scores for the second process to determine an overall score for the second process, wherein the overall score for the second process indicates an effectiveness of how one or more metrics are being used to monitor the second process, an indication of whether or not one or more contingency plans are in place should the second process fail, and an indication of whether or not one or more process procedures associated with the second process are being followed; and compare the overall score for the first process and the overall score for the second process to determine an allocation of resources.

22. The apparatus of claim 21, wherein the instructions, when executed by the at least one processor, cause the apparatus to:
   determine an average of the plurality of scores for the first process; and
   determine an average of the plurality of scores for the second process.

23. The apparatus of claim 21, wherein the first process is in a first business unit and the second process is in a second business unit, the second business unit being different from the first business unit.

24. The apparatus of claim 21, wherein the instructions, when executed by the at least one processor, cause the apparatus to:
   identify a portion of the plurality of process health assessment criteria that are associated with a category of the plurality of categories of process health assessment criteria;
   identify a portion of the plurality of scores for the first process that correspond to one or more of the portion of the plurality of process health assessment criteria; and
   combine the portion of the plurality of scores for the first process to determine a category score for the first process, the category score for the first process corresponding to the category of the plurality of categories of process health assessment criteria.

25. The apparatus of claim 21, wherein the instructions, when executed by the at least one processor, cause the apparatus to:
   identify a portion of the plurality of process health assessment criteria that are associated with a category of the plurality of categories of process health assessment criteria;
   identify a portion of the plurality of scores for the second process that correspond to one or more of the portion of the plurality of process health assessment criteria; and
   combine the portion of the plurality of scores for the second process to determine a category score for the second process, the category score for the second process corresponding to the category of the plurality of categories of process health assessment criteria.

26. The apparatus of claim 21, wherein the plurality of process health assessment criteria includes at least 10 criteria.

* * * * *